UNITED STATES PATENT OFFICE.

JOHN GAMGEE, OF CHELSEA, GREAT BRITAIN.

IMPROVEMENT IN REFRIGERATING MEDIUMS.

Specification forming part of Letters Patent No. 196,654, dated October 30, 1877; application filed October 16, 1877; patented in England July 27, 1874.

*To all whom it may concern:*

Be it known that I, JOHN GAMGEE, No. 379 King's Road, Chelsea, in the county of Middlesex and Kingdom of Great Britain, at present residing at the Metropolitan Hotel, Washington, District of Columbia, in the United States of America, have invented certain Improvements in Refrigerating or Freezing Liquids, of which the following is a specification:

In refrigerating or freezing liquids the usual medium employed to transfer the low temperature produced in the apparatus to the ice-boxes or ice-molds is brine, being a solution of chloride of sodium in water.

Now, it is found that brine corrodes the material of the apparatus, and is therefore very detrimental.

My invention consists in the use of an aqueous solution of glycerine as a substitute for brine.

Pure glycerine does not freeze, and a solution containing fifty per cent. water remains liquid at 0° Fahrenheit, and I prefer that strength for solid ice making; while a solution containing eighty per cent. water does not solidify above 25°, and is therefore quite equal to a solution of common salt or brine, and does not possess the destructive properties of the latter.

I claim as my invention—

An aqueous solution of glycerine as a medium for transferring the low temperature produced by ether or other volatilizable liquid to the water or body to be refrigerated, as hereinbefore described.

JOHN GAMGEE.

Witnesses:
 JNO. T. PICKETT,
 GEO. F. GRAHAM.